Nov. 4, 1924.

F. L. MacDONALD 1,514,254

GOLF SCORE CARD

Filed Feb. 28, 1922    2 Sheets-Sheet 1

F. L. MacDONALD 1,514,254

GOLF SCORE CARD

Filed Feb. 28, 1922

INVENTOR
Frederick L. MacDonald
by his attorney
Warren G. Ogden

Patented Nov. 4, 1924.

1,514,254

UNITED STATES PATENT OFFICE.

FREDERICK L. MacDONALD, OF BOSTON, MASSACHUSETTS.

GOLF-SCORE CARD.

Application filed February 28, 1922. Serial No. 539,359.

*To all whom it may concern:*

Be it known that I, FREDERICK L. MAC-DONALD, a citizen of the United States, residing at Boston, in the county of Suffolk and State of Massachusetts, have invented certain new and useful Improvements in Golf-Score Cards, of which the following is a specification.

The invention to be hereinafter described relates to score cards or sheets for recording the scores of contestants in a game of golf.

One of the purposes of the invention is to provide a simple score card or sheet whereby the record of the score of a player or players may be conveniently recorded without alteration of the score to the advantage of the player, and without the use of a pencil.

In carrying the invention into practical effect, a sheet of paper may have a series of slits in a marginal portion thereof forming strips numbered consecutively to correspond with the numbers of the holes of the golf course, and each strip may be provided with scored or weakened lines at intervals extending transversely to the length thereof, thereby forming a series of coupons or sections, the latter having score representing numbers thereon arranged in numerical order. The construction is such that a player may tear from the strips a number of coupons or sections, leaving stubs having terminal sections bearing the numbers representing the number of strokes taken in playing the holes. In this connection it should be distinctly understood that the invention is not limited in its scope to recording the score of a single hole, but includes the use of score strips having the characteristics described for recording the score for the whole or part of a game.

With the aforesaid and other purposes in view, the character of the invention may be best understood by reference to the following description of one good form thereof shown in the accompanying drawings, wherein:

Fig. 1 is a plan of the score card or sheet in unfolded condition;

Fig. 2 is a plan of the score card or sheet in open condition displaying the score recording strips; and Fig. 3 is a plan of the score card or sheet in folded condition.

Referring to the drawings, the score card or sheet embodying the invention, may be cut out of paper to form a blank 1 conveniently oblong in form. One of the marginal portions of the blank has a series of slits 3 incised therein and extending a substantial distance in from an edge of the blank to provide a series of strips or tongues 5, each having a free end, a secured end, and free side edges intermediate said ends.

These strips may be scored or weakened along lines 7 extending transversely of the strips at intervals to form sections or coupons 9.

These sections may be marked with a series of score representing numerals arranged in numerical order, with the lowest numeral on the section at the free end of the strip, and the highest numeral on the section adjacent the secured end of the strip. For purposes of illustration, each strip is marked with numbers from 2 to 9 inclusive, although it will be understood that the strip may have any number of sections as desired.

Preferably the strip forming slits 3 terminate short of a longitudinal line 11 on the blank, which is offset somewhat from the longitudinal center line of the blank, leaving a space or margin 13 which, in the present instance, is separated from the secured ends of the strips by a heavy sight line 15.

This space or margin 13 may contain informative data in respect to the game. In the present instance, numerals are placed on this space corresponding to the numbers of the holes of the course, said numbers being directly beneath the heavy line 15, and in line with the columns of numbers on the strips.

Beneath the hole designating numbers are numbers indicating the lengths of the holes, and beneath the latter numbers are numbers representing the par score for the holes. Other matter may be placed on this space if desired, such, for example, as the handicap of a player for the different holes. If the handicap were on all of the holes, the numbers would be placed beneath all of the score strips. On the other hand, if the handicap were on certain of the holes, but not all of them, the handicap numbers can be placed beneath the score strips for the particular holes on which the handicap is placed.

In the present instance of the invention, one portion of the card is devoted to the score of one contestant, and another and similar portion of the card is devoted to the score of his opponent. Suitable blanks may be provided on the margin or space 13 for the names of the players, the date of the game, the name of the person certifying the score, the total score, handicap, net score, and other data as desired.

The blank may be folded on the longitudinal line 11 thereof, so that the margin 13 and score strips 5 will be superposed on the portion 17 of the blank, which may serve as a back or cover to protect the strips.

Since the line 11 on which the blank is folded is offset somewhat from the longitudinal medial line of the blank, the free ends of the score strips will terminate somewhat short from the edge 19 of the blank, and leave a space or margin 21 which may be marked with the words "Out" and "In" for the first and last nine holes of the course respectively.

After the margin 13 and strips 15 have been folded back against the cover 17, the blank may be folded on the transverse line 21 to form the book 23 (Fig. 3) having covers 25 and 27 enclosing the score strips between them. Preferably the transverse folding line 21 is offset somewhat from the medial transverse line of the blank, thereby leaving a margin 29 (Fig. 3) facilitating opening the covers of the book from their positions shown in Fig. 3, to their positions shown in Fig. 2.

The name of the golf club may be marked on the outer face of the cover 25, and the outer face of the other cover 27 may have the local rules of the golf club printed thereon.

After the blank has been folded into book form as described, it may be secured in its folded condition by a wire fastener 31 entered through the back and the margin 13.

In use, each time the contestants finish playing a hole, their scores may be recorded by tearing one or more sections or coupons from the score strips, leaving terminal sections bearing numbers corresponding to the number of strokes taken by the contestants in playing the hole.

In order to illustrate the manner of using the score card, in Fig. 2, the sections or coupons have been torn off to leave a record of the scores of the contestants for the first six holes of the course. Referring to the players as "Self" and "Opponent", on the first hole, self took four strokes and opponent took five strokes. Accordingly, self tore off two sections leaving a stub having a terminal section marked with the number 4 representing his score for that hole, and opponent tore off three sections leaving a stub having a terminal section marked with the number 5 representing his score for that hole. On the second hole, self took five strokes and opponent took four strokes. Accordingly, self tore off three sections leaving a stub having a terminal section marked with the number 5, and opponent tore off two sections leaving a stub having a terminal section marked with the number 4. In a similar manner the scores of self and opponent were recorded for the third, fourth, fifth and sixth holes.

If a player is going around the course alone, his score will be recorded on one of leaves of the book, and if he desires to go around the course again and play thirty-six holes, he can record his score on the other leaf of the book.

In some instances, books may be provided which are specially adapted for a single player, and in such case the book will contain merely eighteen score strips, and the book can be folded on the transverse line 33 instead of on the transverse line 21 as described. If a foursome is being played, each player may be provided with a book having eighteen score strips, or if the type of book containing thirty-six score strips is employed, two such books may be used for recording the scores of the four contestants. This, of course, is on the assumption that it is a four ball match. If the four contestants are playing a best ball match, a single book will serve.

There are many advantages in this score card or book. When the book is opened, the score strips for all of the holes are exposed and readily visible, so that one may readily glance across the book and easily ascertain the scores for all of the holes. This is also an advantage in recording the scores for the successive holes during the game, since ready access may be had to each succeeding score strip for the purpose of tearing the sections or coupons therefrom.

It will be noted that in the present instance the sections at the free ends of the strips are marked with the numeral 2, but they might be marked with the numeral 1 if desired, in order to take care of those occasional instances in which a player succeeds in holing out in one stroke.

The score card or book described, furnishes a desirable record for the scores, since the numbers are printed on the sections and there is no opportunity for fraudulent reduction or change in the score for a hole after the record has once been made on the card by tearing off the sections, whereas, in the old method of keeping a score, where a pencil is employed, it is easy for a player to erase and change his score, if he is so disposed.

The score card or book is simple in construction, cheap to produce, and can be used with facility.

It will be understood that the invention is not limited to the specific embodiment shown, and that various deviations may be made therefrom without departing from the spirit and scope of the appended claims.

What is claimed is:

1. A golf score sheet having a series of strips disposed side-by-side to indicate a player's score for a succession of holes and each having a secured end, a free end and free side edges, scored lines extending transversely of the strips at intervals between their secured and free ends to provide detachable sections, the latter being marked with score numbers arranged in numerical order with the lowest number on the section farthest from the secured end; that one or more of said sections may be torn off a strip to leave a stub having a terminal section with a number thereon representing a player's score.

2. A golf score sheet having a series of separated strips secured at ends thereof and each having scored lines extending transversely thereof providing detachable sections and score representing numerals on the sections arranged in numerical order, with the lowest number on the section farthest from the secured end that one or more of the sections may be torn off to leave stubs having terminal sections with numbers thereon representing a player's score for the holes of the golf course, said sheet having a plurality of such series of strips for recording the scores of the contestants in the game.

3. A golf score sheet having a marginal portion thereof slitted to present a series of separated score strips having weakened lines extending transversely thereof to form detachable sections, and score representing numerals on the sections arranged in numerical order with the lowest number on the section at the free end of the strip.

4. A golf score sheet having slits in a marginal portion thereof forming a series of individual tongues lying side-by-side in the same plane, numbers on the sheet opposite the tongues and corresponding to the numbers of the holes of a golf course, each of said tongues being weakened on lines extending transversely thereof at intervals to form sections, and score representing numbers on the sections arranged in numerical order with the lowest number at the free end of each tongue.

5. A golf score sheet comprising a blank folded to present a leaf and a cover, said leaf having slits therein forming a series of score strips, each having a free end, a secured end and free side edges, said strips being marked with score representing numbers arranged in numerical order along the strip with the highest and lowest numbers at the secured and free ends, respectively, of the strip, that end portions of the strips may be torn off to leave terminal numbers representing the player's score for the holes of the golf course.

6. A golf score sheet comprising a blank folded to provide a leaf and a cover, a marginal portion of the leaf having slits therein and scored on lines extending transversely of the slits to provide parallel series of sections each series marked with score representing numerals arranged in numerical order thereon with the lowest numbers at the outer edge of said slit margin, said leaf having a portion at the ends of said strips marked with informative data concerning the game.

7. A golf score book comprising a blank folded longitudinally and transversely to provide leaves and covers for said leaves, the latter having marginal slits therein forming a series of strips corresponding to the holes of the course, each of said strips being weakened on lines extending transversely thereof to form detachable sections, and score representing numbers marked on said sections in numerical order.

8. A golf score book comprising a blank folded longitudinally and transversely thereof to provide leaves and covers, a fastener securing said leaves and covers in superposed relation, said leaves having marginal slits therein forming a series of strips lying side-by-side, each of said strips having a free end, a secured end and free side edges, and each of said strips being weakened on lines extending transversely thereof to provide sections having score representing numbers thereon arranged in numerical order.

9. A golf score book comprising a cover and a leaf, the latter having slits in a portion thereof forming a series of strips, each scored at intervals to provide sections having score representing numerals thereon arranged in numerical order, said cover having an area larger than said leaf, leaving a margin projecting beyond the free ends of the strips to protect the same.

10. A golf score book comprising covers and leaves between said covers, said leaves having slits therein forming score strips, each provided with weakened lines extending transversely thereo to form sections, score representing numerals on said sections arranged in numerical order, and one of said leaves and its cover being larger than the other leaf and its cover to leave a margin on the larger leaf and cover to facilitate opening of the book.

11. A golf score card comprising a leaf and a cover therefor, said leaf having a marginal portion slitted to provide a number of score strips corresponding to the number of holes of a golf course, each of said strips having detachable sections marked with score representing numerals arranged in a column and in numerical order.

12. The method of making score cards which includes the steps of forming a rectangular blank, slitting one edge thereof part way toward the center in a manner to produce a comb-like margin, folding said slit margin to a position overlying the remainder of the blank, and then folding the blank at right-angles to the first fold with the slit portion of the blank inside the unslit portion.

13. The method of making score cards which comprises cutting one margin of a rectangular blank by a series of parallel slits extending inward from the edge thereof forming detached tongues, folding said tongues upon the unslit portion of the blank so that their free ends lie inside the edge of the underlying unslit portion, and then doubling said folded blank centrally of the series of tongues in a manner to enclose said tongues within the unslit portion of the blank.

14. The method of making score cards which includes the steps of folding a rectangular blank along a line parallel to but slightly offset from its longitudinal center-line, doubling the folded blank along a line parallel to but slightly offset from its transverse center-line, and providing the first fold with a series of independent marginal tongues.

15. The method of making score cards which comprises slitting inward from one edge of a blank to produce a comb-like margin, weakening the material of said slit margin at intervals throughout the length of the slits, folding said slit margin upon the unslit portion of the blank on a line parallel to the inner ends of said slits, and doubling the folded blank on a line parallel to said slits with the slit and weakened margin within the unslit portion of the blank.

FREDERICK L. MacDONALD.